May 15, 1945.	M. TURCHAN ET AL	2,375,831
HYDRAULIC DUPLICATING LATHE ATTACHMENT
Original Filed Sept. 20, 1941    2 Sheets-Sheet 1
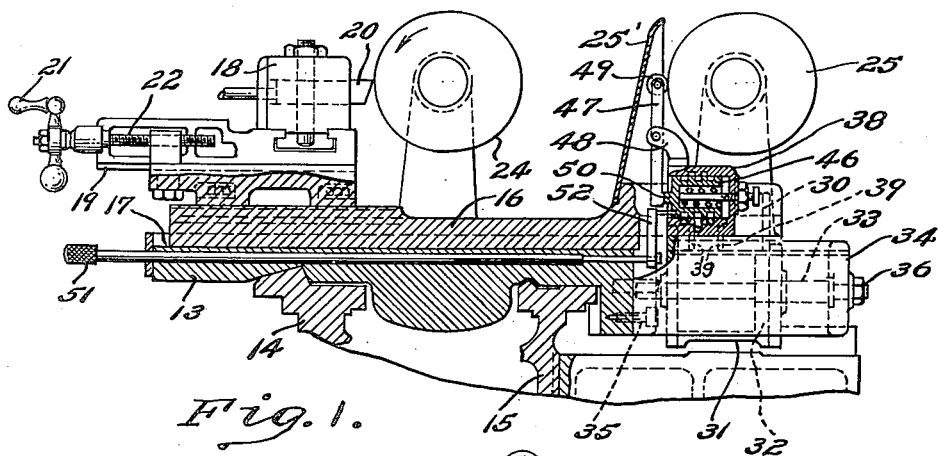
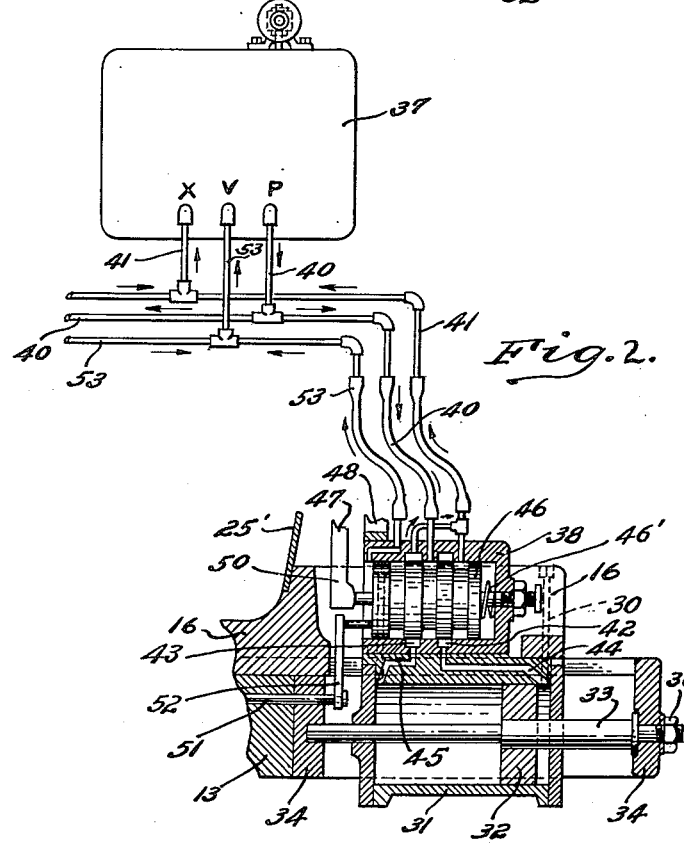
INVENTOR.
Manuel Turchan
BY Curtis Walker
Robert A. Sloman
ATTORNEY

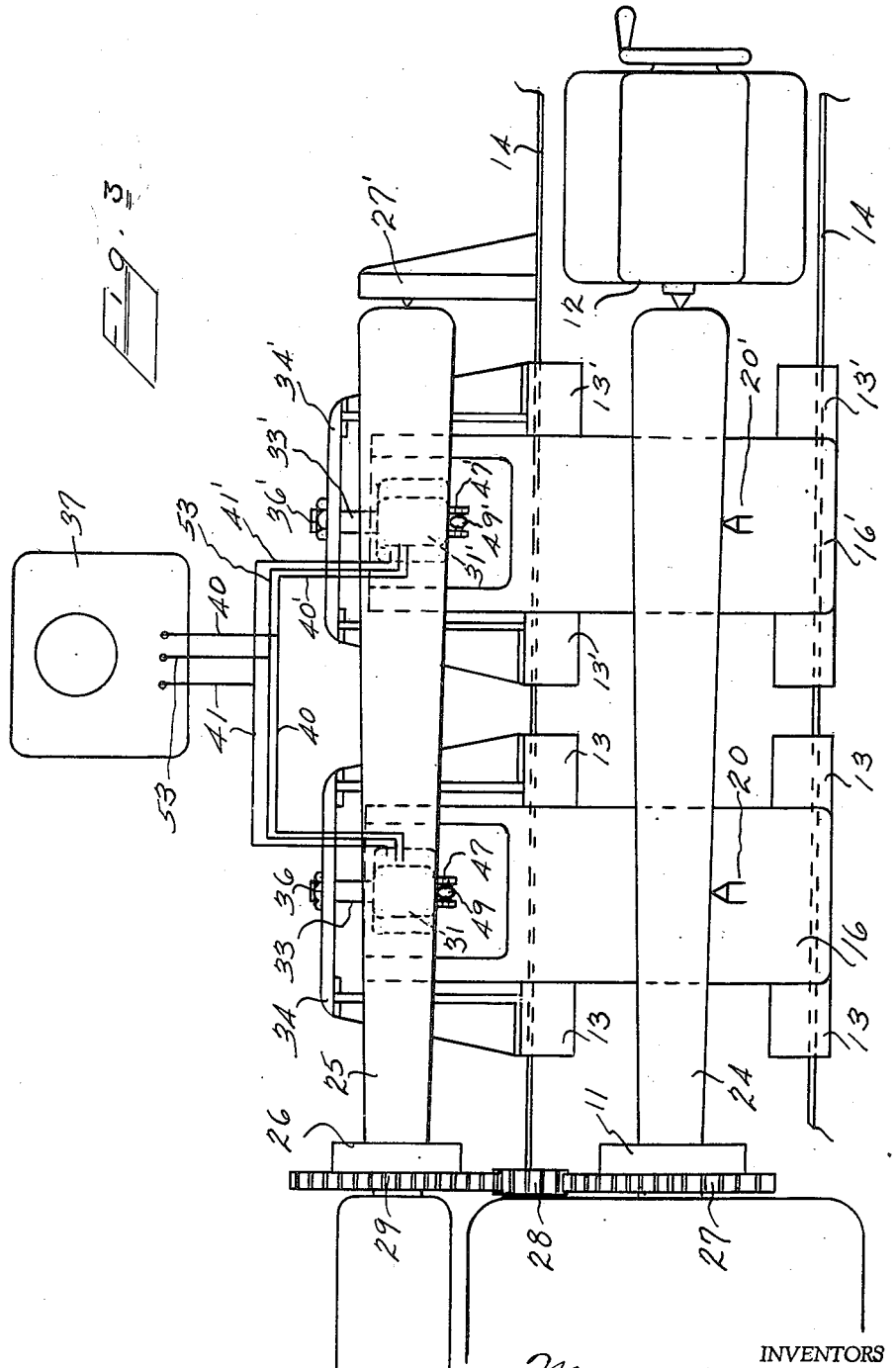

Patented May 15, 1945

2,375,831

UNITED STATES PATENT OFFICE 2,375,831

HYDRAULIC DUPLICATING LATHE ATTACHMENT

Manuel Turchan, Dearborn, and Curtis Walker, Detroit, Mich.

Original application September 20, 1941, Serial No. 411,714, now Patent No. 2,313,849, dated March 16, 1943. Divided and this application April 23, 1942, Serial No. 440,269

13 Claims. (Cl. 82—14)

This application is a divisional part of our copending application, Serial No. 411,714, filed September 20, 1941, Patent No. 2,313,849, issued March 16, 1943, relating to a Hydraulic duplicating lathe attachment.

This invention relates to a hydraulic duplicating lathe attachment as set out in our copending application, Serial No. 411,714.

The invention further relates to a hydraulic duplicating attachment for a lathe having a longitudinally reciprocable carriage and a cross-slide thereon carrying a lathe tool, permitting transverse adjustment of said tool with respect to a rotating work-piece.

More particularly this invention relates to a duplicating attachment for a lathe wherein a cam or master is rotated in unison with the work-piece, and a tracer mechanism is employed for engagement with said master for regulating the transverse movement of the lathe tool carrying cross-slide, whereby on longitudinal feeding of said cross-slide supporting carriage the work-piece is reproduced from the master.

It is the object of this invention to provide a lathe tool carrying cross-slide for the longitudinally reciprocable carriage of a lathe with means for automatically governing reciprocable transverse movement of said slide with respect to a rotating work-piece.

It is the object of this invention to provide in a lathe means for rotatively supporting a cam in spaced relation to and for movement in unison with a rotating work-piece.

Another object of the invention resides in the provision on said tool carrying cross-slide of a tracer mechanism for co-operative engagement with the surface of said rotatable cam, together with reciprocable means responsive to said tracer for governing reciprocal transverse movement of said cross-slide.

It is the object of this invention to provide a reciprocable cylinder for actuating said cross-slide together with hydraulic means responsive to said tracer mechanism for actuating said cylinder.

It is the further object of this invention to provide a tracer mechanism carried by said reciprocable cylinder for corresponding movement with said cross-slide.

It is the further object herein to provide a plurality of cross-slides carried upon said longitudinally reciprocable carriage or a plurality of carriages, with each slide carrying a lathe tool, a tracer mechanism, and means for separately regulating the reciprocal transverse movement of each cross-slide.

It is the still further object of this invention to provide a plurality of cross-slides with a reciprocable cylinder separately actuating each slide, with an exterior fluid pressure source or sources joined to said cylinders, and with separate tracer mechanisms on each slide for governing the flow of fluid to one end or the other of each of said cylinders.

It is the still further object of this invention to provide tracer controlled hydraulic means for regulating longitudinal movement of the cross-slide supporting carriage.

It is the still further object of this invention to embody the principles thereof in grinding apparatus wherein it is sought to reproduce a work-piece from a templet or master.

The invention herein relates to the various arrangements of elements and their various combinations as hereinafter set out and described in connection with the appended drawings of which:

Fig. 1 is a fragmentary partially sectioned elevational view of the lathe, carriage, cross-slide, and duplicating attachment therefor.

Fig. 2 is a fragmentary partially sectioned diagrammatic view of the hydraulic connections for said attachment.

Fig. 3 is a fragmentary diagrammatic plan view of a lathe with a plurality of carriages, cross-slides, duplicating attachments for each cross-slide and hydraulic connections for said attachments.

The above drawings are to be considered merely as preferable embodiments of the invention, reference to which is made in the detailed specification hereinafter set out.

In the drawings, Figs. 1 and 3 illustrate the conventional lathe with head-stock 11 and tail-stock 12. A longitudinally reciprocal carriage 13 rides upon suitable ways 14 supportable by the base member 15.

A cross-slide 16 disposed upon carriage 13, with a suitable dove-tail connection 17 carries a lathe tool support 18 for tool 20, whereby the latter may be adjusted longitudinally and transversely with respect to a rotating work-piece 24 supported between the head-stock 11 and tail-stock 12.

The tool support or clamping means 18 is also slidably disposed upon the cross-slide 16 with a suitable dove-tail connection 19, thereby permitting manual transverse adjustment of the tool 20 by means of a suitable handle 21 and threaded shaft 22 as in Fig. 1.

Referring to Fig. 1 the rotatable work-piece is indicated at 24 engaging the lathe tool 20.

The hydraulic attachment for said lathe consists of means governing reciprocal transverse feeding of the lathe tool 20 with respect to the rotating work-piece 24, as said tool is mechanically fed longitudinally thereof; i. e., this is accomplished by alternately governing the reciprocable movement of the cross-slide 16.

Referring to Fig. 3 the cam 25 rotatably journaled between the head-stock 26 and the tail-stock 27', is adapted to rotate in unison with the work-piece 24 by means of the synchronizing gears 27, 28 and 29, operating from the head-stock 11 to the head-stock 26.

Cross-slide 16 is secured at its end by bolts 30 to the reciprocal cylinder 31. A stationary piston 32 is disposed within said cylinder secured to the stationary piston rod 33, as seen in Fig. 1.

A suitable bracket 34 joined to the longitudinally reciprocable carriage 13 by bolts 35 provides a support for the piston rod 33 disposed therethrough and bolted at 36.

Thus the reciprocable cylinder 31 rides upon the stationary piston rod 33 and being bolted to the cross-slide 16, thereby actuates the same governing reciprocal transverse feeding thereof.

Cylinder 31 is hydraulically actuated by fluid under pressure from an external pressure source such as the hydraulic unit 37 shown diagrammatically in Figs. 2 and 3 and containing a fluid pressure pump.

By means of flexible conduit 40, fluid under pressure is thus conducted to one side or the other of piston 32 within cylinder 31 causing movement of said cylinder in one direction or the other depending on which end of the cylinder receives the fluid.

A tracer or fluid control mechanism, interposed between said hydraulic unit and cylinder is employed for regulating such flow of fluid, automatically directing the same to one end or the other of said cylinder depending upon the movement of valve 46 within said tracer mechanism. Said tracer consists of a hollow cylindrical housing 38 secured to the top of cylinder 31 by bolts 39.

Fluid inlet and outlet openings are provided in said housing communicating respectively with the fluid pressure conduit 40 from the hydraulic unit 37 and the return exhaust conduit 41.

Said housing 38 also has two fluid pressure outlet openings 42 and 43 as in Fig. 2 for conducting fluid under pressure to one end or the other of cylinder 31 Fig. 2 through the conduits 44 and 45 respectively.

Valve 46 is reciprocally disposed within housing 38 and is provided with a plurality of annular openings adapted for alternate communication with the fluid outlets 42 and 43, and with the fluid pressure inlet conduit 40 and return conduit 41.

Consequently in certain positions of said valve fluid under pressure from conduit 40 is conducted to outlet 42 and through conduit 44 to one end of the cylinder. Fluid thereby forced out of said cylinder on the other side of piston 32 is permitted to return through conduit 45 and opening 43 whence it is conducted through the housing 38 and through the exhaust conduit 41 back to the hydraulic unit 37.

On the other hand in certain other positions of valve 46 fluid under pressure from conduit 40 is conducted to outlet 43 and through conduit 45 to the opposite end of cylinder 31. Fluid thereby forced out of said cylinder on the other side of piston 32 is permitted to return through conduit 44 and opening 42 whence it is conducted through housing 38 and through the exhaust conduit 41 back to the hydraulic unit 37.

This operation is more fully described in our co-pending application, Serial #307,754, now Patent No. 2,301,719, which relates to a Hydraulic duplicating attachment for high speed heads.

Movement of valve 46, which is resiliently seated at 46' within housing 38, and its positioning within said housing is determined by the lever 47, which is centrally pivoted to the bracket 48 secured upon housing 38.

One end of said lever has rotatably journaled thereon a ball-bearing journaled roller 49 adapted to co-operatively engage the surface of the rotatable cam 25.

The oppostie end 50 of lever 47 is adapted to engage the top of valve 46 forcing the same inwardly within the housing 38 or permitting said valve to move outwardly by action of its resilient mounting 46'.

Thus it is seen that variations in the surface of the cam cause corresponding movements of the tracer valve 46 which in turn govern transverse feeding of the cylinder 31 and cross-slide 16, thereby regulating the position of the lathe tool 20 with respect to the rotating work-piece 24. Consequently the above described duplicating attachment enables the reproduction of the rotatable cam 25 in the rotating workpiece 24.

A manual control 51 (Fig. 1) is reciprocably disposed through the carriage 13 within a transverse opening therein and an arm 52, secured upon the end thereof is adapted to engage the top of valve 46 for operation thereof independently of the hydraulic control above described.

It will be noted further that a conduit 53 from a vacuum producing means within the hydraulic unit 37 is joined to the housing 38 and is adapted to scavenge any leaking fluid therefrom returning the same to said hydraulic unit.

A shield 25' carried by cross-slide 16 is employed as shown in Fig. 1 for protecting the templet 25 from flying chips of metal.

Referring to Fig. 3 it is seen that a plurality of cross-slides may be employed upon reciprocable carriages 13 and 13' with each cross-slide being actuated by and carrying a reciprocable cylinder. It will be noted further that each cross-slide also carries a separate lathe tool and a corresponding tracer mechanism, whereby the cam 25 may be reproduced at a plurality of points in the work-piece at one time. It will be understood that the device would be operable with only one carriage and a plurality of cross-slides.

It will be seen that the operation of each cross-slide is independent of the other, each having a separate hydraulic duplicating attachment.

In Fig. 3 a second cross-slide 16' is disposed upon the carriage 13' actuated by the reciprocal cylinder 31' upon its own stationary piston rod 33' secured to the bracket 34' by bolt 36'.

Cylinder 31' also is provided with a separate tracer mechanism having a lever 47' and a roller 49' for co-operative engagement with the surface of the rotatable cam 25.

It is seen that the hydraulic unit 37 provides fluid under pressure for actuating cylinder 31' through supply conduit 40' and returning exhaust fluid through conduit 41'. Also a vacuum conduit 53 is provided for removing any fluid leakage from the tracer.

From Fig. 3 it will be seen that the invention herein includes the use of one or more hydraulically controlled lathe tool supporting cross-slides whereby production output of the lathe may be multiplied as desired.

It will be noted that carriages 13 and 13' are actuated for longitudinal movement by a single power source, such as a rotatable screw; however it is contemplated that said carriages be separately operated if desired.

Having described our invention reference should now be had to the following claims for determining the scope thereof.

We claim:

1. A lathe comprised of a reciprocable carriage, a reciprocable lathe-tool carrying cross-slide thereon, a rotatable work-piece, a fluid reciprocated cylinder with a stationary piston therein, joined to said cross-slide, a piston rod, a bracket secured to said carriage for slidably supporting said cylinder, a master oppositely disposed from said work-piece and rotatable in unison therewith, a tracer cooperatively engaging said master, fluid control means responsive to movements of said tracer for controlling fluid under pressure to said cylinder, for governing reciprocable lathe-tool cross-feeding.

2. A lathe comprised of a reciprocable carriage, a reciprocable lathe-tool carrying cross-slide thereon, a rotatable work-piece, a fluid reciprocated cylinder with a stationary piston therein, joined to said cross-slide, a piston rod, a bracket secured to said carriage for slidably supporting said cylinder, a master oppositely disposed from said work-piece and rotatable in unison therewith, a valve housing mounted on said cylinder, a fluid controlling valve resiliently seated within said housing for directing fluid from a pressure source to one side or the other of said piston, a tracer pivotally mounted on said housing cooperatively engaging said master for actuating said valve, thereby governing reciprocable feeding of said cross-slide.

3. The combination with a lathe having a plurality of reciprocable carriages, a reciprocable lathe-tool carrying cross-slide on each carriage, and a rotatable work-piece; of a fluid reciprocated cylinder joined to each slide, a master rotatable in unison with said work-piece, a valve housing mounted on each cylinder, a fluid controlling valve resiliently seated within each housing for directing fluid from a pressure source to one end or the other of each of said cylinders, a tracer pivotally mounted on each of said housings cooperatively engaging said master at a plurality of points for actuating each valve, thereby separately governing reciprocable feeding of each cross-slide.

4. A lathe comprised of a reciprocable carriage, a reciprocable lathe-tool carrying cross-slide thereon, a rotatable work-piece, a fluid reciprocated cylinder with a stationary piston therein, joined to said cross-slide, a piston rod, a bracket secured to said carriage for slidably supporting said cylinder, a master rotatable in unison with said work piece, a tracer cooperatively engaging said master, fluid control means responsive to movements of said tracer for controlling fluid under pressure to said cylinder, for governing reciprocable lathe-tool cross-feeding, and a hydraulic unit for delivering fluid under pressure to said fluid controlling means.

5. A lathe comprised of a reciprocable carriage, a reciprocable lathe-tool carrying cross-slide thereon, a rotatable work-piece, a fluid reciprocated cylinder with a stationary piston therein, joined to said cross-slide, a piston rod, means secured to said carriage for slidably supporting said cylinder, a master oppositely disposed from said work-piece and rotatable in unison therewith, a tracer cooperatively engaging said master, fluid control means responsive to movements of said tracer for controlling fluid under pressure to said cylinder, for governing reciprocable lathe-tool cross-feeding.

6. A lathe comprised of a reciprocable carriage, a reciprocable lathe-tool carrying cross-slide thereon, a rotatable work-piece, reciprocable means joined to said cross-slide, means secured to said carriage for slidably supporting said reciprocable means, a master oppositely disposed from said work-piece and rotatable in unison therewith, a valve housing mounted on said means, a fluid controlling valve resiliently seated within said housing for directing fluid from a pressure source to one side or the other of said means, a tracer pivotally mounted on said housing cooperatively engaging said master for actuating said valve, thereby governing reciprocable feeding of said cross-slide.

7. A lathe comprised of a reciprocable carriage, a reciprocable lathe-tool carrying cross-slide thereon, a rotatable work-piece, reciprocable means joined to said cross-slide, a master oppositely disposed in parallel relation to said work-piece and rotatable in unison therewith, a valve housing mounted on said means, a fluid controlling valve resiliently seated within said housing for directing fluid from a pressure source to one side or the other of said means, a tracer pivotally mounted on said housing cooperatively engaging said master for actuating said valve, thereby governing reciprocable feeding of said cross-slide.

8. A lathe comprised of a reciprocable carriage, a reciprocable lathe-tool carrying cross-slide thereon, a rotatable work-piece, reciprocable means joined to said cross-slide, a master oppositely disposed in parallel relation to said work-piece and rotatable in unison therewith, operating means for said work-piece, operating means for said master interconnected with said work-piece operating means, a valve housing mounted on said reciprocable means, a fluid controlling valve resiliently seated within said housing for directing fluid from a pressure source to one side or the other of said reciprocable means, a tracer pivotally mounted on said housing cooperatively engaging said master for actuating said valve, thereby governing reciprocable feeding of said cross-slide.

9. The combination with a lathe having a reciprocable carriage, a plurality of reciprocable lathe tool carrying cross-slides on said carriage, and a rotatable work-piece; of reciprocable means joined to each slide, a master rotatable in unison with said work-piece, a valve housing mounted on each of said reciprocable means, a fluid controlling valve resiliently seated within each housing for directing fluid from the pressure source to one end or the other of each of said reciprocable means, a tracer pivotally mounted on each of said housings cooperatively engaging said master at a plurality of points for actuating each valve, thereby separately governing reciprocable feeding of each cross-slide.

10. A lathe comprised of a reciprocable carriage, a reciprocable lathe-tool carrying cross-slide thereon, a rotatable work piece, reciprocable means joined to said cross-slide, means secured to said carriage for supporting said reciprocable means, a master rotatable in unison with said work piece, a valve housing mounted on said means, a fluid controlling valve seated within said housing for directing fluid from a pressure source to one side or the other of said means, a tracer pivotally mounted on said housing cooperatively engaging said master for actuating said valve, thereby governing reciprocable feeding of said cross-slide.

11. A lathe comprised of a reciprocable carriage, a reciprocable lathe-tool carrying cross-slide thereon, a rotatable work piece, reciprocable means joined to said cross-slide, a master rotatable in unison with said work piece, a valve housing mounted on said means, a fluid controlling valve seated within said housing for directing fluid from a pressure source to one side or the other of said means, a tracer pivotally mounted on said housing cooperatively engaging said master for actuating said valve, thereby governing reciprocable feeding of said cross-slide.

12. A lathe comprised of a reciprocable carriage, a reciprocable lathe-tool carrying cross-slide thereon, a rotatable work piece, reciprocable means joined to said cross-slide, a master rotatable in unison with said work piece, operating means for said work piece, operating means for said master interconnected with said work piece operating means, a valve housing, a fluid controlling valve seated within said housing for directing fluid from a pressure source to one side or the other of said reciprocable means, a tracer pivotally mounted on said housing cooperatively engaging said master for actuating said valve, thereby governing reciprocable feeding of said cross-slide.

13. The combination with a lathe having a reciprocable carriage, a plurality of reciprocable lathe tool carrying cross-slides on said carriage, and a rotatable work piece; of reciprocable means joined to each slide, a master rotatable in unison with said work piece, a valve housing for each of said reciprocable means, a fluid controlling valve seated within each housing for directing fluid from the pressure source to one end or the other of each of said reciprocable means, a tracer pivotally mounted with respect to each of said housings cooperatively engaging said master at a plurality of points for actuating each valve, thereby separately governing reciprocable feeding of each cross-slide.

MANUEL TURCHAN.
CURTIS WALKER.